United States Patent
Tuyls et al.

(10) Patent No.: US 6,892,629 B2
(45) Date of Patent: May 17, 2005

(54) SYSTEM FOR PUMPING AND DISPENSING SAUCE

(75) Inventors: James M. Tuyls, Vacaville, CA (US); Antonio J. Jepson, Dixon, CA (US); Juha K. Salmela, Citrus Heights, CA (US); John W. Dewing, Folsom, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

(21) Appl. No.: 10/364,689

(22) Filed: Feb. 10, 2003

(65) Prior Publication Data

US 2003/0159596 A1 Aug. 28, 2003

Related U.S. Application Data

(60) Provisional application No. 60/355,262, filed on Feb. 8, 2002.

(51) Int. Cl.$^7$ ............... A23L 1/00; A23P 1/00; A21C 9/04; B05C 11/10
(52) U.S. Cl. ............... 99/450.1; 99/516; 118/13; 118/24; 118/679
(58) Field of Search ............ 99/494, 516, 450.1–450.7, 99/325–333, 337, 338, 403–417, 444–450, 483, 468; 426/289, 292, 302, 523, 510, 511, 231, 233; 118/13, 24, 25, 411, 695–698, 704–705, 308–310, 313, 52, 712, 713, 669, 679, 680, 681, 683, 684, 686, 696; 220/316, 314, 912, 315; 219/432, 430, 429, 435, 492, 494, 497, 506, 400, 401

(56) References Cited

U.S. PATENT DOCUMENTS

| | | | | |
|---|---|---|---|---|
| 3,631,818 A | * | 1/1972 | Zito | 99/450.1 |
| 3,725,974 A | * | 4/1973 | Kuhlman | 99/450.1 |
| 3,868,048 A | * | 2/1975 | Soodalter | 222/380 |
| 4,112,834 A | * | 9/1978 | Thiry | 99/450.1 |
| 5,092,229 A | * | 3/1992 | Chen | 99/337 |
| 5,400,700 A | * | 3/1995 | Bois | 99/403 |
| 5,429,039 A | * | 7/1995 | Chang | 99/331 |
| 5,701,805 A | * | 12/1997 | Sa | 99/331 |
| 5,727,448 A | * | 3/1998 | Sa | 99/331 |
| 5,768,976 A | * | 6/1998 | Suk | 99/337 |
| 5,839,357 A | * | 11/1998 | Ha et al. | 99/337 |
| 6,032,610 A | * | 3/2000 | Fitch et al. | 118/13 |
| 6,135,012 A | * | 10/2000 | Kao | 99/331 |
| 6,259,068 B1 | * | 7/2001 | Barrow | 219/432 |
| 6,283,015 B1 | * | 9/2001 | Kwon et al. | 99/337 |
| 6,325,016 B1 | * | 12/2001 | Fitch et al. | 118/25 |
| 6,450,361 B1 | * | 9/2002 | Mendelson et al. | 220/573.1 |
| 6,526,874 B1 | * | 3/2003 | Khatchadourian et al. | 99/334 |
| 6,545,252 B2 | * | 4/2003 | Wang | 219/432 |
| 6,626,996 B1 | | 9/2003 | Amigh et al. | |
| 6,629,493 B1 | * | 10/2003 | Schaible et al. | 99/352 |
| 6,705,209 B2 | * | 3/2004 | Yang et al. | 99/337 |

* cited by examiner

*Primary Examiner*—Timothy F. Simone
(74) *Attorney, Agent, or Firm*—Townsend and Townsend and Crew LLP

(57) ABSTRACT

Embodiments of the present invention are directed to a rotary sauce dispensing apparatus for applying a sauce on a receiving surface such as a pizza dough. In one embodiment, a system for producing a flow of a sauce to a dispenser comprises a rotating table configured to support and rotate the receiving surface thereon around an axis generally perpendicular to the receiving surface for receiving the sauce, and a sauce dispensing member having a dispensing outlet disposed above the rotating table to dispense the sauce on the receiving surface disposed on the rotating table. The sauce dispensing member is movable between an edge position above an outer edge of the receiving surface and a center position above a center of the receiving surface. A sauce pumping device is configured to deliver a flow of the sauce to the sauce dispensing member. A controller is coupled with the sauce pumping device and configured to control a sauce flow rate of the flow of the sauce to the sauce dispensing member based on a rotational speed of the rotating table and a speed of movement of the sauce dispensing member between the edge position and the center position.

12 Claims, 10 Drawing Sheets

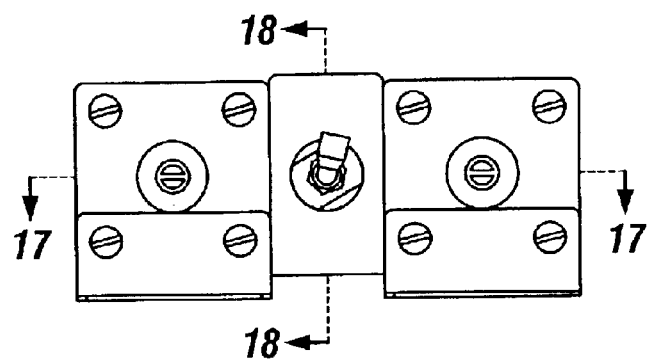
FIG. 16
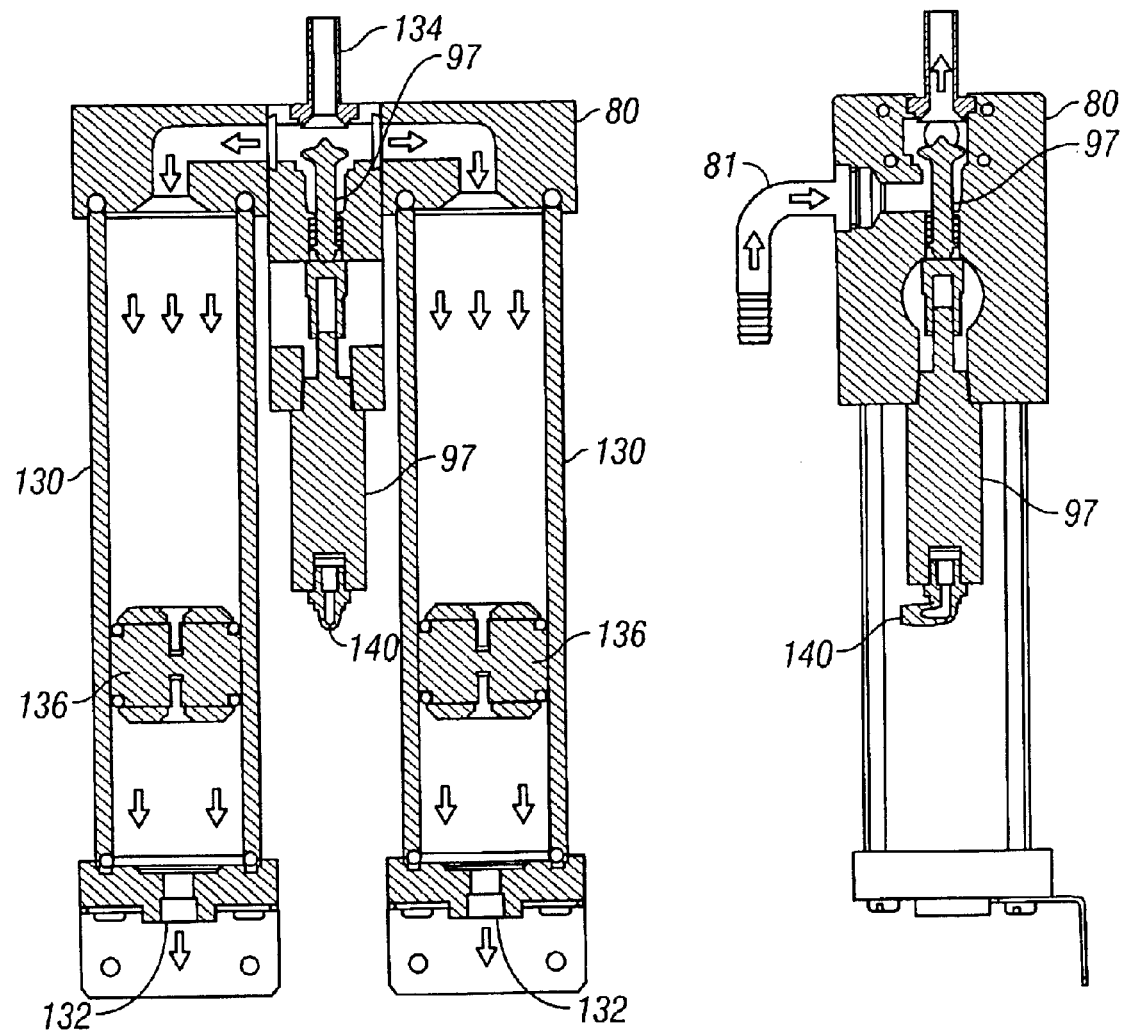
FIG. 17   FIG. 18

SYSTEM FOR PUMPING AND DISPENSING SAUCE

This application is based on and claims the benefit of U.S. Provisional Patent Application No. 60/355,262, filed Feb. 8, 2002, the entire disclosure of which is incorporated herein by reference.

BACKGROUND OF THE INVENTION

The present invention relates generally to food dispensing apparatus and, more particularly, to an apparatus for accurately dispensing sauces or condiments or the like.

Conventional ways of saucing pizza require manual application of a sauce such as a spicy tomato sauce on the pizza dough. Manual application of the pizza sauce is often performed by a novice, hurried chef who distorts the house recipe and produces an uneven coating. Attempts to provide an accurate dose and an even coating require too much time. In addition, using ladles, spatulas, brushes, and the like in handling the pizza sauce may raise sanitary concerns.

Ladles with brushes or spatulas require a vat of pre-mixed sauce from which is ladled an inconsistent portion. The sauce is brought, dripping to the dough surface, leaving an unsanitary trail of sauce on the table and the sides of the vat. The chef must carefully, expertly spread the sauce across the surface of the dough without leaving puddles or voids or damaged dough. This approach is the least costly, but is also the least consistent and is rather unsanitary.

Spoodles incorporate a hose or nozzle for pumping the sauce into an attached measuring or spreading ladle. The bottom of the ladle is used to spread the sauce. The spoodle is returned, dripping, to the holding device, thereby leaving an unsanitary trail of sauce on the table and the inside of the holding device. This approach is more costly and more consistent, but is still unsanitary.

Pouring nozzles are much more consistent in portion control for dispensing the sauce, but they are rather costly. The chef must still carefully and expertly spread the sauce across the surface of the dough without leaving puddles or voids or damaged dough. The spreading device and its storage remain unsanitary.

BRIEF SUMMARY OF THE INVENTION

The present invention is directed to a rotary sauce dispensing apparatus for applying a sauce on a receiving surface such as a pizza dough. A sauce dispensing member is guided to move a dispensing outlet between an edge position above an outer edge of the pizza dough and a center position above a center of the pizza dough to dispense the sauce from the dispensing outlet on the pizza dough. This improves sanitation of the delivery system. The sauce dispensing member is designed to provide the desired consistent thickness of the sauce on the entire pizza surface.

In accordance with an aspect of the present invention, an apparatus for dispensing a sauce on a receiving surface comprises a rotating table configured to support and rotate the receiving surface thereon around an axis generally perpendicular to the receiving surface for receiving the sauce. A sauce dispensing member has a dispensing outlet disposed above the rotating table to dispense the sauce on the receiving surface disposed on the rotating table. The sauce dispensing member is movable between an edge position above an outer edge of the receiving surface and a center position above a center of the receiving surface. A controller is coupled with the sauce dispensing member and configured to control a speed of movement of the sauce dispensing member between the edge position and the center position to form a layer of sauce on the receiving surface.

Another aspect of the invention is directed to a method of dispensing a sauce on a receiving surface. The method comprises rotating the receiving surface, providing a sauce dispensing member having a dispensing outlet disposed above the receiving surface, and automatically guiding the sauce dispensing member to move the dispensing outlet between an edge position above an outer edge of the receiving surface and a center position above a center of the receiving surface at a speed to dispense the sauce from the dispensing outlet to form a layer of sauce on the rotating receiving surface.

In accordance with another aspect of the present invention, an apparatus for producing a flow of a sauce to a dispenser comprises an accumulator including an accumulator chamber with an accumulator inlet to receive and store the sauce and a dispense member configured to dispense the sauce from the accumulator chamber out through an accumulator outlet, and a pump configured to pump the sauce through the accumulator inlet to the accumulator chamber. A diverter valve is coupled with the accumulator and being movable between a closed position to close the accumulator outlet and an open position to open the accumulator outlet. A control member is coupled with the pump, the diverter valve, and the accumulator. The control member is configured to move the diverter valve to the closed position and activate the pump to pump the sauce through the accumulator inlet to the accumulator chamber in a recharge mode, and to move the diverter valve to the open position and drive the dispense member to dispense the sauce from the accumulator chamber out through an accumulator outlet in a dispense mode.

Another aspect of the invention is directed to a method of producing a flow of a sauce to a dispenser. The method comprises providing an accumulator including an accumulator chamber with an accumulator inlet to receive and store the sauce. The accumulator has a dispense member configured to dispense the sauce from the accumulator chamber out through an accumulator outlet. In a recharge mode, the method comprises closing the accumulator outlet and activating a pump to pump the sauce through the accumulator inlet into the accumulator chamber. In a dispense mode, the method comprises opening the accumulator outlet and driving the dispense member to dispense the sauce from the accumulator chamber out through the accumulator outlet.

In accordance with another aspect of the present invention, a system for producing a flow of a sauce to a dispenser comprises a rotating table configured to support and rotate the receiving surface thereon around an axis generally perpendicular to the receiving surface for receiving the sauce, and a sauce dispensing member having a dispensing outlet disposed above the rotating table to dispense the sauce on the receiving surface disposed on the rotating table. The sauce dispensing member is movable between an edge position above an outer edge of the receiving surface and a center position above a center of the receiving surface. A sauce pumping device is configured to deliver a flow of the sauce to the sauce dispensing member. A controller is coupled with the sauce pumping device and configured to control a sauce flow rate of the flow of the sauce to the sauce dispensing member based on a rotational speed of the rotating table and a speed of movement of the sauce dispensing member between the edge position and the center position.

Another aspect of the invention is directed to a method of dispensing a sauce on a receiving surface. The method comprises rotating the receiving surface; providing a sauce dispensing member having a dispensing outlet disposed above the receiving surface; delivering a flow of the sauce to the sauce dispensing member; guiding the sauce dispensing member to move the dispensing outlet between an edge position above an outer edge of the receiving surface and a center position above a center of the receiving surface; and automatically controlling a sauce flow rate of the flow of the sauce to the sauce dispensing member based on a rotational speed of the rotating table and a speed of movement of the sauce dispensing member between the edge position and the center position.

BRIEF DESCRIPTION OF THE DRAWINGS

FIG. 16 is a bottom plan view of an accumulator assembly in the sauce pumping system of FIG. 1 according to another embodiment of the invention;

FIG. 17 is a cross-sectional view of the accumulator assembly of FIG. 16 along line XVII—XVII;

FIG. 18 is a cross-sectional view of the accumulator assembly of FIG. 16 along line XVIII—XVIII showing the diverter valve in a recharge position.

DETAILED DESCRIPTION OF THE INVENTION

Figure 1:
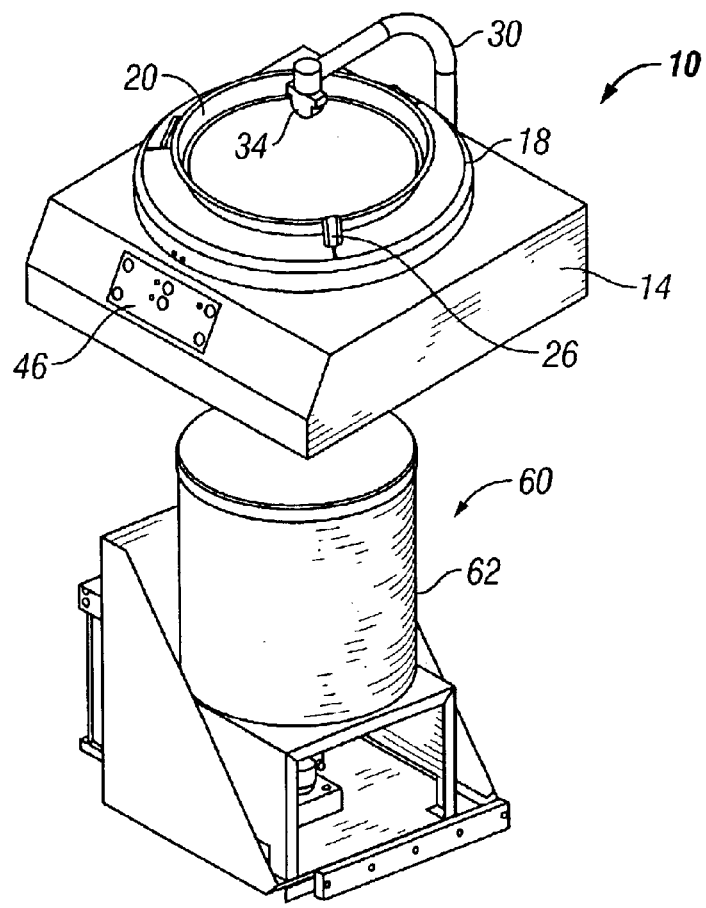
FIG. 1 is a perspective view of a sauce pumping system and a rotary sauce dispensing apparatus according to an embodiment of the present invention.
Figure 2:
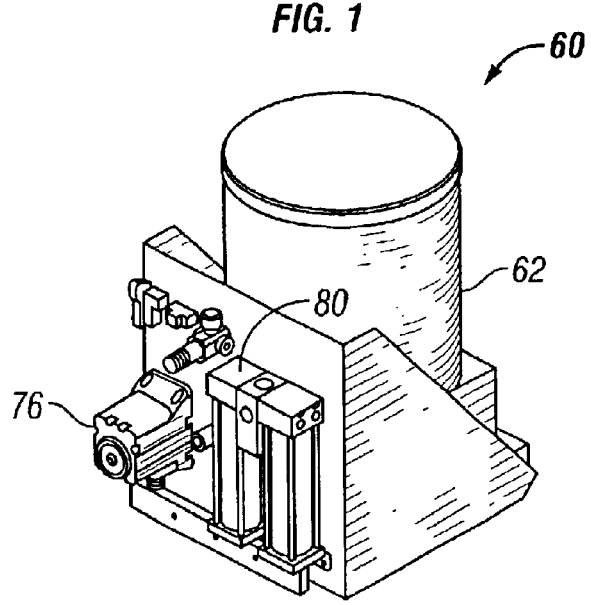
FIG. 2 is another perspective view of the sauce pumping system of FIG. 1.
Figure 3:
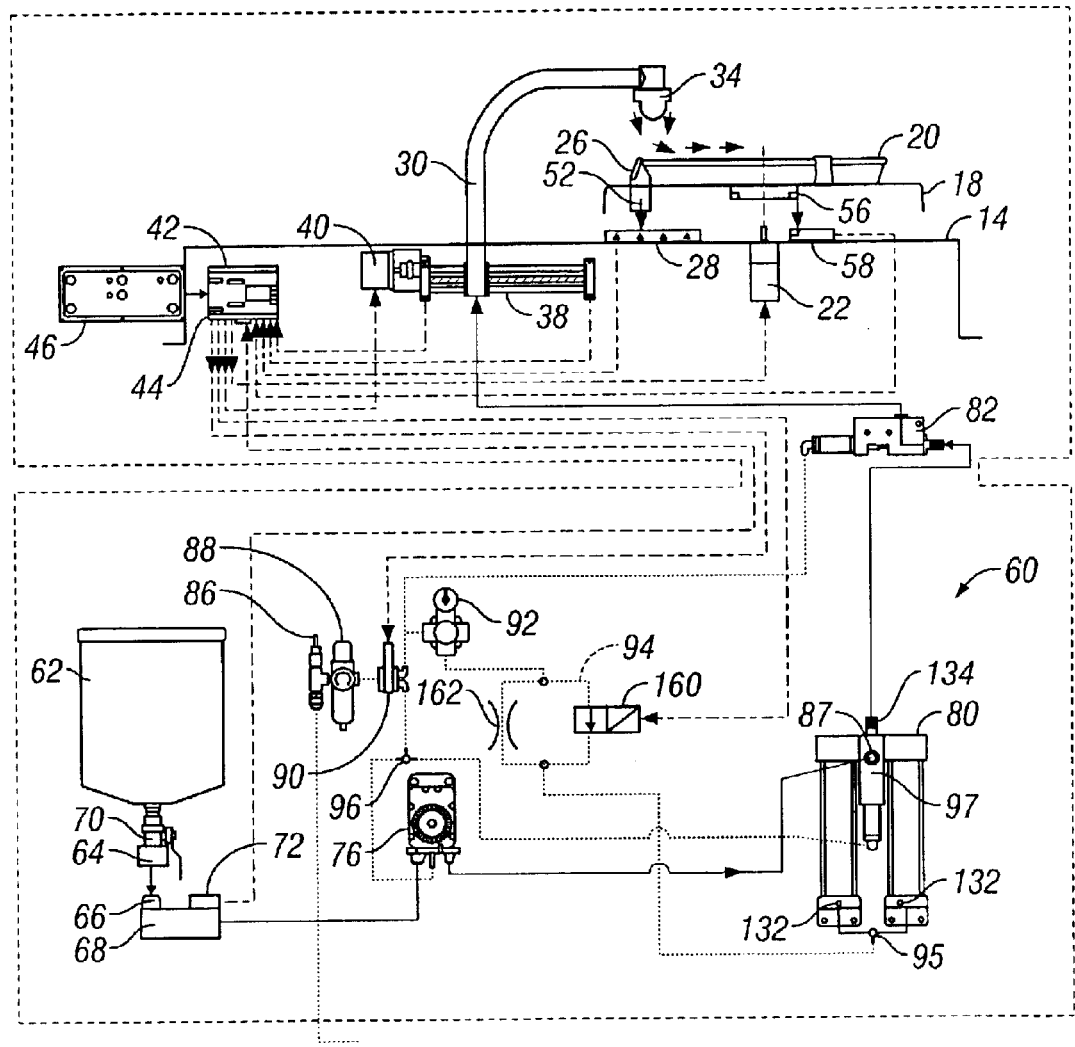
FIG. 3 is a simplified schematic view of the sauce pumping system and rotary sauce dispensing apparatus of FIG. 1.

FIGS. 1–3 show a rotary sauce dispensing apparatus 10 including a base 14, which supports thereon a rotating table or turntable 18. A pizza pan 20 is placed on top of the turntable 18. A drive motor 22 drives the turntable 18 in rotation while the base 14 remains stationary. The drive motor 22 desirably moves at a constant speed. The pizza pan 20 rotates with the turntable 18. The turntable 18 includes automatic centering grip members 26 for centering the pizza pan 20. A pan size sensor or location sensor 28 is disposed below the turntable 18 and are arranged in the radial direction for sensing the position of the automatic centering pins 26. This turntable mechanism rotates the pizza pan 20 while the pizza sauce is dispensed and applied on a pizza dough placed on the pizza pan 20.

For dispensing a sauce, the apparatus 10 employs a dispensing arm 30 which extends from a proximal end supported by the base 14 to a distal end disposed above the pizza pan 20. The distal end of the dispensing arm 30 is coupled to and supports a nozzle 34. The proximal end of the dispensing arm 30 is supported on a linear track 38, and is movable on the linear track 38 by a linear motor 40 to position the nozzle 34 above different radial locations of the pizza pan 20 to dispense the sauce over the surface of the pizza dough on the pizza pan 20. FIG. 1 shows one dispensing arm 30. In general, the sauce dispensing apparatus 10 may include one or more dispensing arms. The use of multiple dispensing arms enables the dispensing apparatus 10 to dispense different sauces.

A power supply 42 and a controller or processor 44 such as a programmable logic circuit (PLC) provide the power and control to operate the linear drive motor 40 and turntable motor drive 22. An operator control panel 46 is provided for operating the dispensing apparatus 10. As seen in FIG. 3, the sauce dispensing apparatus 10 includes the centering grips 26 for centering the pan 20 on the turntable 18. Pan size actuators 52 are coupled to the centering grips 26 to activate the pan size sensor 28 to provide measurement of the size of the pan 20. One or more rotational actuators 56 are coupled to the turntable 18 to activate the rotational sensor 58 to provide measurement of the rotational speed of the turntable 18.

The finished sauce to the dispensing apparatus 10 is supplied by a sauce pumping system 60. As shown in FIGS. 1–3, the sauce is provided in a container such as a hopper or a vat 62. The vat 62 is desirably removable and replaceable, and includes an outlet 64 that mates with an inlet 66 of a pre-mix inlet adapter 68. The outlet 64 and inlet 66 may form a vacuum sealed connection. A valve 70 such as a ball valve is provided near the outlet 64 of the vat 62, and can be opened after the connection is formed between the vat 62 and the adapter 68. An empty hopper sensor 72 is provided in the adapter 68 to sense and inform the controller 44 if the hopper 62 is empty and needs to be replaced. The pre-mix inlet adapter 68 pre-mixes the sauce for improved consistency. The sauce is driven by a pump 76 through an accumulator assembly 80 having an inlet 81 to the dispensing apparatus 10. A shut-off valve 82 is desirably provided near the dispenser 34 to shut off the sauce flow when appropriate to minimize dripping.

The pump 76 is typically a hydraulic pump such as a double diaphragm pump, but may be any suitable type of pump. A compressed gas or air source 84 supplies a gas or air through a safety valve 86 and a filter regulator 88 to a four-way valve 90, which serves as a control member or control valve for controlling operation of the pumping system 60. The four-way valve 90 has two positions. In position A, the four-way valve 90 directs air flow through a pressure regulator 92 to the shut-off valve 82 and through an air flow reduction circuit 94 via a T-connector 95 to the accumulator 80. In position B, the four-way valve 90 is coupled via a T-connector 96 to the pump 76 and to a diverter valve 97 disposed at the outlet of the accumulator assembly 80. The operation of the sauce pumping system 60 is described in greater detail below.

Figure 4:
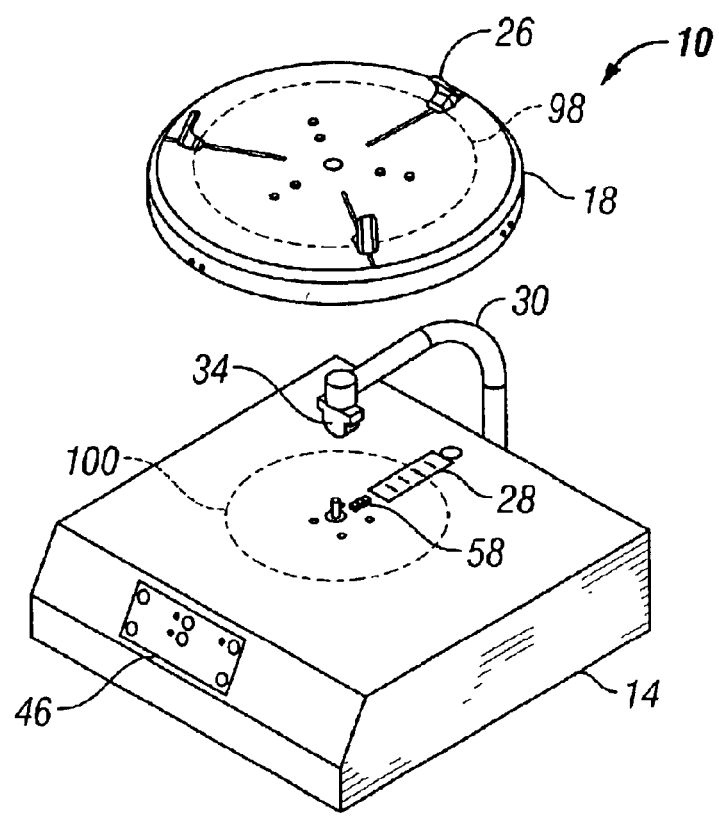
FIG. 4 is an exploded perspective view of part of the rotary sauce dispensing apparatus of FIG. 1.

FIG. 4 more clearly illustrates the sauce dispensing arm assembly including the dispensing arm 30 and the nozzle 34 disposed at the distal end of the dispensing arm 30. The dispensing arm 30 has a goose-neck shape, and has a hollow interior for delivering the sauce from the proximal end to the distal end for dispensing through the nozzle 34. The centering grips 26 are disposed around the outside edge or perimeter 98 of the pan 20. The pan size sensor 28 is shown as a pan size sensor rack disposed on the base 14 for sensing the position of the pan size actuator 52 connected to the centering grips 26 (see FIG. 3). The sensor rack 28 extends radially generally between the center and the edge of the turntable 18. As the turntable 18 rotates, the pan size actuators 52 travel along the pan size actuator path 100 and activate the pan size sensor 28. The size of the pan 20 is determined from the signal generated by the sensor rack 28. In one embodiment, each pan size actuator 52 has a magnet and the pan size sensor rack 28 includes reed switches that are activated by the magnet of the pan size actuators 52. The pan size sensor 28 is coupled to the controller 44 as shown in FIG. 3. The controller 44 provides to the linear drive motor 40 the pan size information received from the sensor 28 to define the starting location of the nozzle 34 of the dispensing arm 30 for saucing the pizza on the pan 20.

Figure 5:
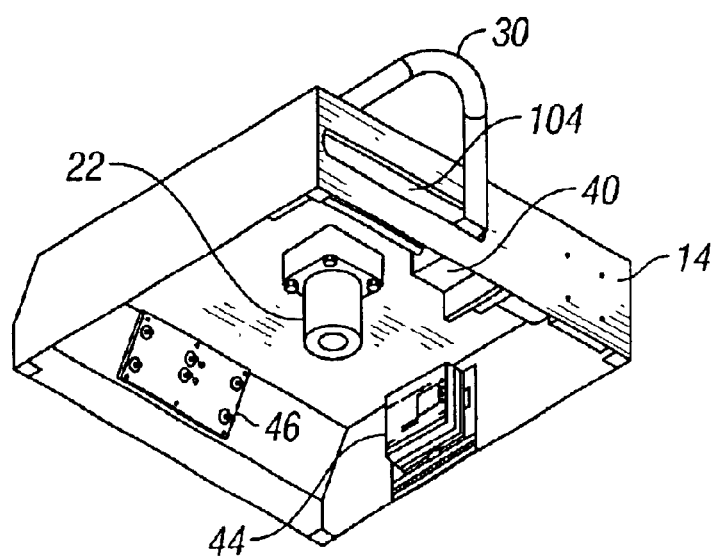
FIG. 5 is a lower perspective view of the rotary sauce dispensing apparatus of FIG. 1.
Figure 6:
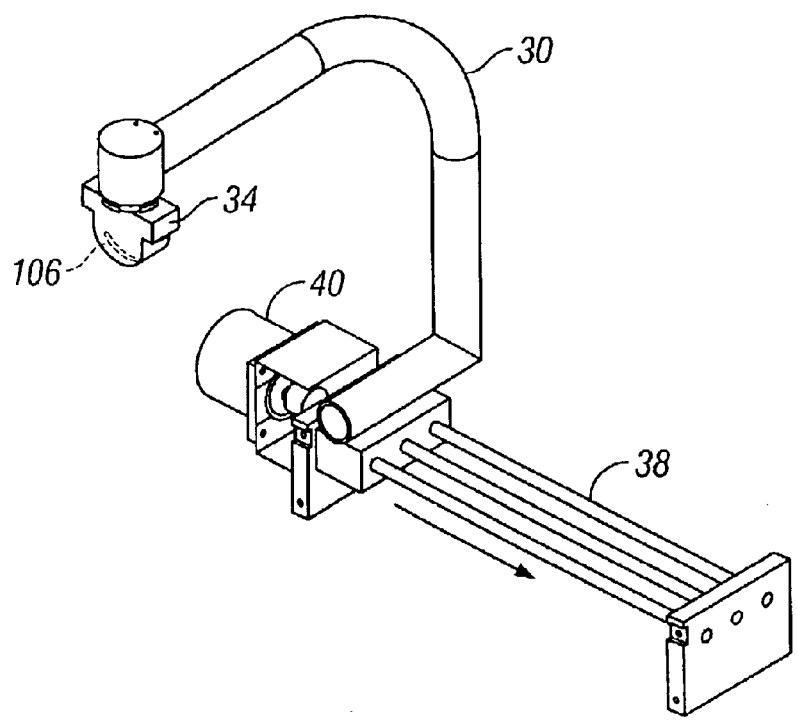
FIG. 6 is a perspective of a dispensing arm mechanism in the rotary sauce dispensing apparatus of FIG. 1.
Figure 7:
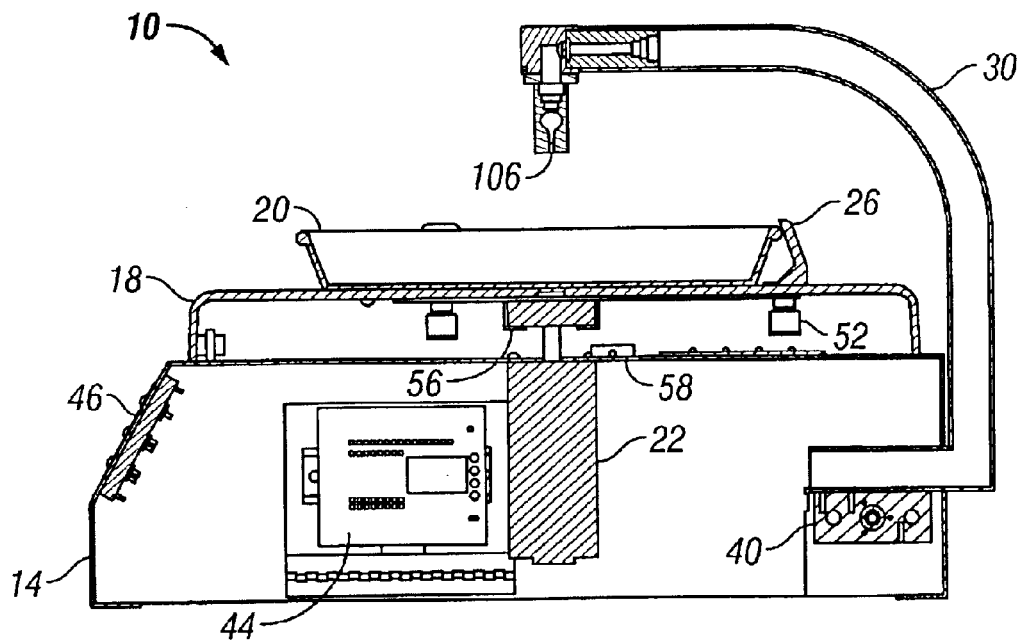
FIG. 7 is a cross-sectional view of the rotary sauce dispensing apparatus of FIG. 5.

FIG. 5 shows mounting of the turntable drive motor 22, linear motor 40, controller 44, and operator control panel 46 to the base 14. The base 14 includes a side slot 104 that allows the dispensing arm 30 to slide along the linear track 38. The assembly of the dispensing arm 30 and linear motor 40 is more clearly seen in FIG. 6. The nozzle 34 desirably has a longitudinal discharge outlet 106 for discharging the sauce in a ribbon-like pattern as the pan 20 is rotated by the turntable 18 under the nozzle 34. By moving the dispensing arm 30 toward the center of the pan 20 as it rotates, the sauce is deposited on the pan 20 to cover the pizza dough in the form of a spiral ribbon pattern. FIG. 7 shows a cross-sectional view of the rotary sauce dispensing apparatus 10 as described. In some embodiments, the discharge outlet 106 is variable in size that may be adjusted mechanically and/or electrically. For example, the discharge outlet 106 may be rotatable to change its size. The discharge outlet 106 may decrease in size as it approaches the position above the center region of the pan 20 to reduce the amount of sauce dispensed. This may be used to achieve a more uniform layer of sauce dispensed since the surface area in the center region is smaller than the surface area in the outer edge region.

Figure 8:
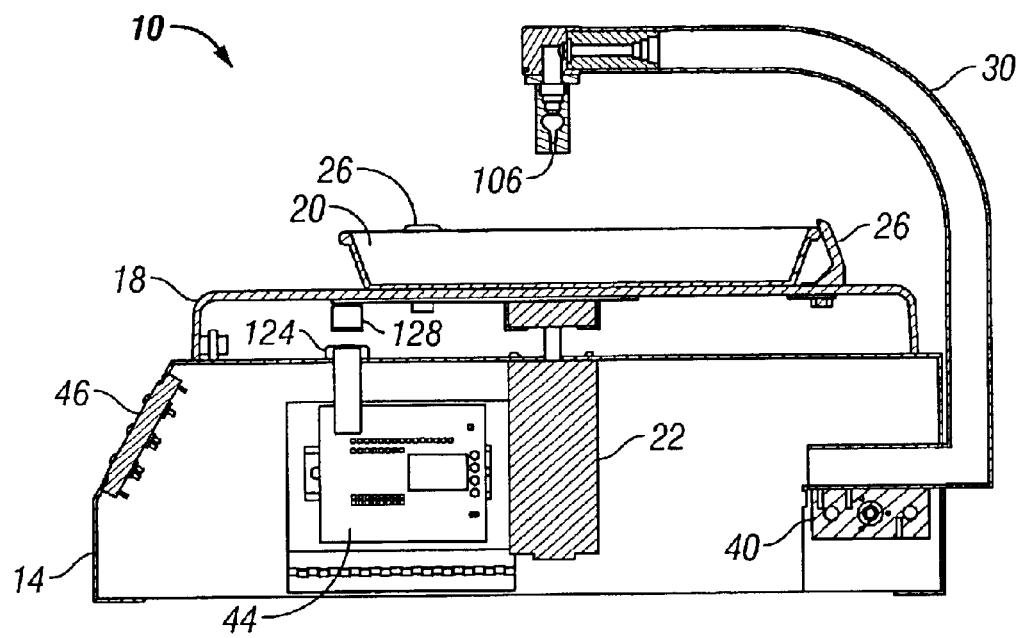
FIG. 8 is a cross-sectional view of the rotary sauce dispensing apparatus according to another embodiment of the invention.
Figure 9:
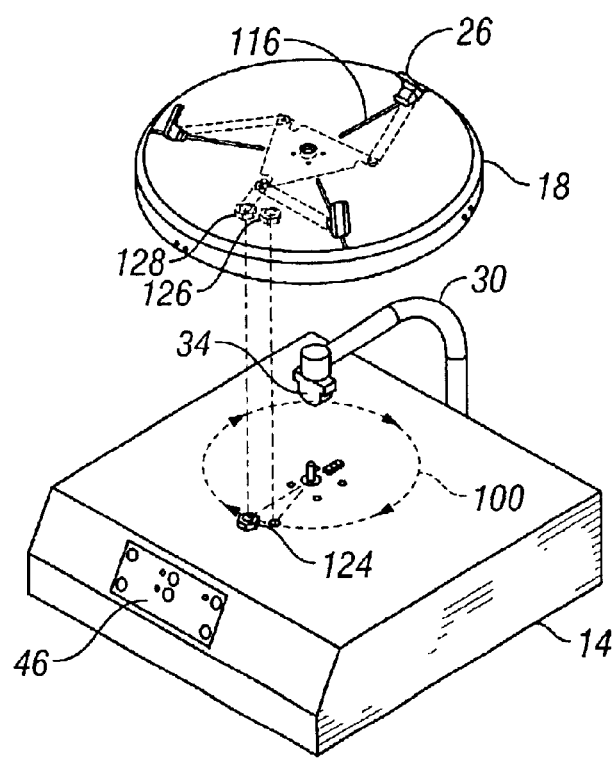
FIG. 9 is an exploded perspective view of the rotary sauce dispensing apparatus of FIG. 8.

As seen in FIGS. 4 and 7, the rotational sensor 58 is disposed on the base 14 for measuring the rotational speed of the turntable 18. The turntable 18 typically rotates at a constant speed which can be set by the user. The rotational speed is provided by the rotational sensor 58 to the controller 44. Based on the rotational speed of the turntable 18 and the pan size of the pan 20, the controller 44 calculates the speed of the linear motor 40 for moving the dispensing arm 30 to dispense the sauce through the nozzle 34 to achieve a substantially uniform layer of sauce (e.g., thickness variation within about 10%). FIGS. 8 and 9 show another embodiment involving a different way of measuring the rotational speed of the turntable 18 and the pan size as described below.

Figure 10A:
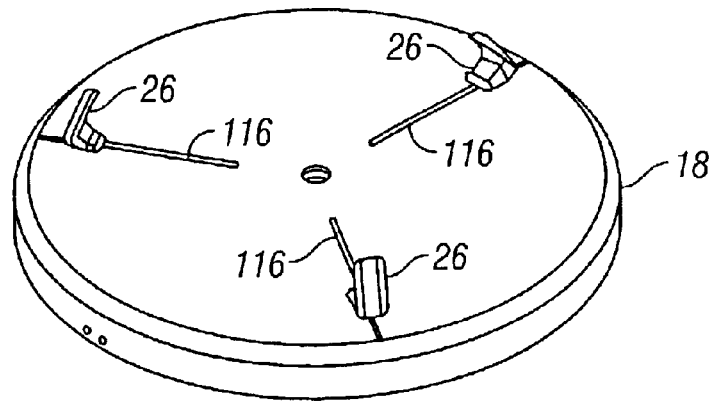
FIG. 10A is an upper perspective view of a rotating platform in the rotary sauce dispensing apparatus of FIG. 1.
Figure 10B:
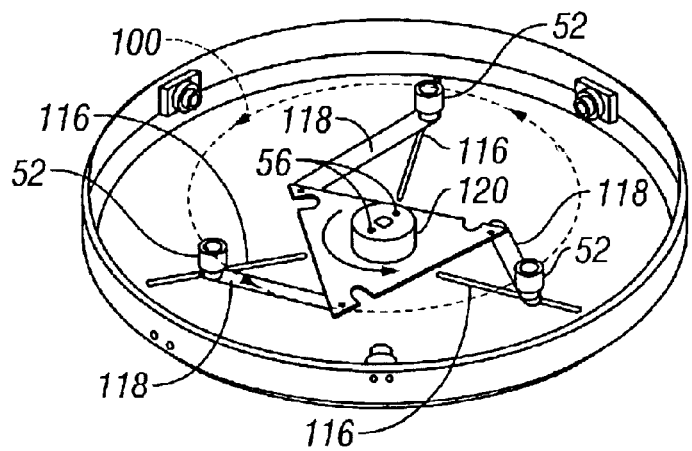
FIG. 10B is a lower perspective view of the turntable of FIG. 10A.

The turntable 18 in FIGS. 10A and 10B includes three automatic centering grip pins or members 26 disposed above the turntable 18 for centering the pizza pan 20. More grip members 26 may be used in other embodiments. The grip members 26 are guided to move along radial slots 116. The grip members 26 are each pivotally connected to a centering link 118 which is pivotally coupled with and driven by a centering device or hub 120. When the centering links 118 are aligned with the radial slots 116, the centering links 118 are in the fully extended position. As the centering hub 120 rotates, the centering links 118 pivot relative to the centering hub 120 to move the grip members 26 simultaneously inward. Disposed below the grip members 26 are corresponding pan size actuators 52, which are used to activate the pan size sensor 28 (FIGS. 3, 4, and 7) disposed below the actuators 52 when the grip members 26 stop moving inward upon encountering the edge of the pizza pan 20. The turntable 18 carrying the pan size actuators 52 rotates with the drive motor 22, and the pan size actuators 52 activate the pan size sensor 28 at the radial location where the grip members 26 stop. The pan size sensor 28 sends signals to the controller 44 to indicate the size of the pizza pan 20. The controller 44 then activates the turntable mechanism to rotate the pizza pan 20 and the sauce dispensing arm assembly to dispense the sauce, and controls their operation based on the size and rotational speed of the pizza pan 20.

A variety of pan size sensors and pan size actuators may be used. In one example, the pan size sensors 28 and actuators 52 are magnetic, and the signals generated are photoelectronic. Other types of sensors that may be used are optical, mechanical, electrical, and the like. FIG. 10B shows the rotational actuators 56 supported on a hub 122 for actuating the rotational sensor 58, which may be magnetic, optical, electrical, or the like.

Figure 10C:
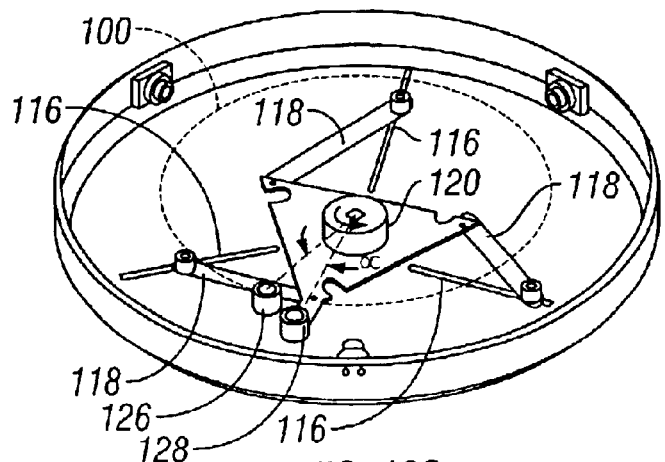
FIG. 10C is a lower perspective view of the turntable of FIGS. 8 and 9.

As shown in FIGS. 8, 9, and 10C, a different embodiment employs an angular offset scheme of measuring the rotational speed of the turntable 18 and the size of the pan 20. A sensor 124 which may be an inductive sensor is disposed at a fixed location on the base 14. The turntable 18 includes three automatic centering grip pins or members 26 disposed above the turntable 18 and slidable along the radial slots 116 for centering the pizza pan 20. The centering hub 120 drives the centering links 118 to move the grip members 26. A hub actuator or turntable actuator 126 is fixed to the turntable 18 at a radial position generally corresponding to the radial position of the sensor 124, so that the turntable actuator 126 may be detected by the sensor 124 as it passes over the sensor 124 during rotation of the turntable 18. A reference sensor 128 is attached to the centering hub 120 at a radial location generally corresponding to the radial position of the sensor 124, so that the reference actuator 128 may also be detected by the sensor 124 as it passes over the sensor 124 during rotation of the turntable 18. Typically, the reference actuator 128 will be angularly spaced from the turntable actuator 126 by an offset angle $\alpha$, which is related to the positions of the grip members 26 and the size of the pan 20. During rotation of the turntable, the turntable actuator 126 and reference actuator 128 will be detected by the sensor 124 at two different points in time. The controller 44 can calculate the offset angle α based on the time difference and the rotational speed of the turntable 18, and determine the size of the pan 20 based on the correlation between the pan size and the angle α, as provided by a lookup table, an equation, or the like. The sensor 124 also serves as a rotational sensor for measuring the rotational speed of the turntable 18 as activated by the turntable actuator 126 passing over the sensor 124 during rotation of the turntable 18.

Figure 11:
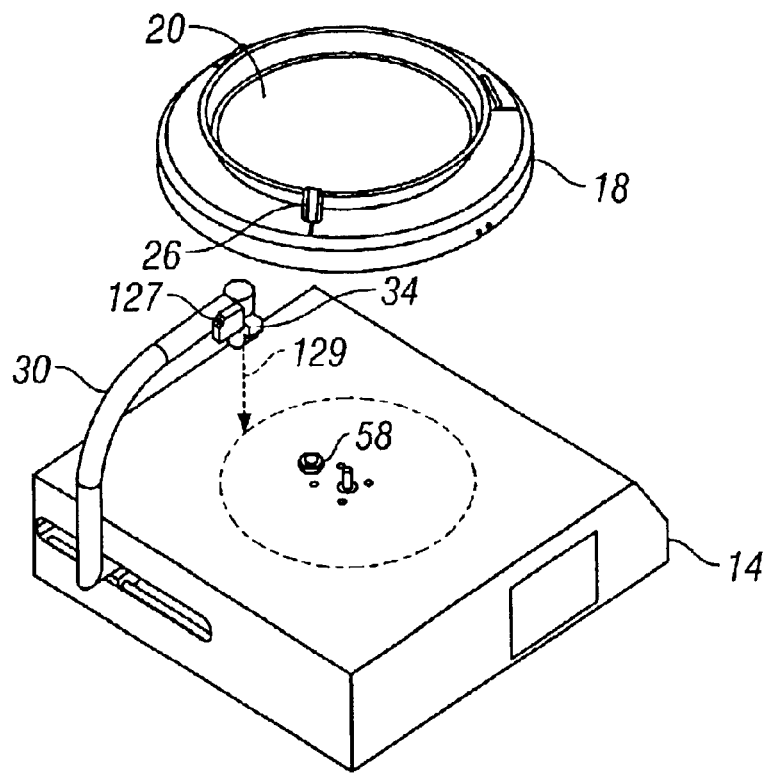
FIG. 11 is an exploded perspective view of the rotary sauce dispensing apparatus according to another embodiment of the invention.
Figure 12:
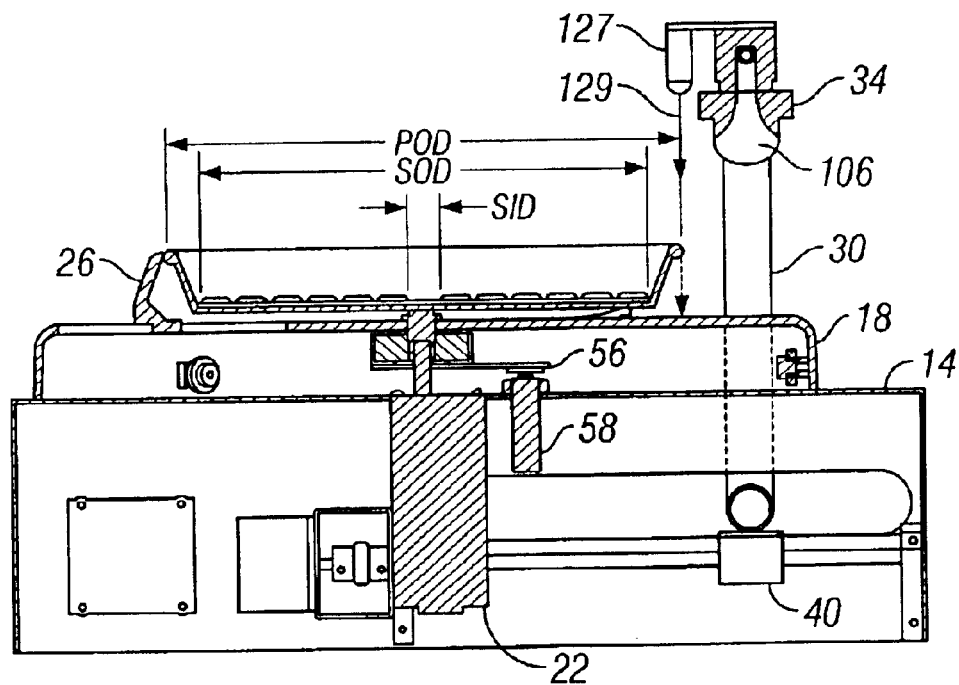
FIG. 12 is a cross-sectional view of the rotary sauce dispensing apparatus of FIG. 11.

Another way to measure the pan size is illustrated in FIGS. 11 and 12. The outer perimeter or edge 98 of the pan 20 is detected by an optical sensor 127 which is attached to the dispensing arm 30 adjacent the dispensing nozzle 34. The sensor 127 is oriented downward along a sensor view line 129. During operation, the dispensing arm 30 is moved from the outside toward the center of the turntable 18. As the sensor 127 crosses the outer edge 98 of the pan 20 from the surface of the turntable 18, it detects an abrupt change in height. The optical sensor 127 sends a signal to the controller 44 which determines the size of the pan 20 by the location of the dispensing arm 30 supporting the sensor 127. The controller 44 may employ a look-up table to look up the pan size. Any suitable optical sensor may be used for the height change detection.

As shown in FIG. 12, the pan 20 has an outer diameter POD. The outer diameter of the sauce SOD is typically spaced inward from the POD. The size of the spacing depends on the type of pizza. For instance, a deep dish pizza typically has a minimal edge spacing between the POD and the SOD, while a thick crust pizza may have an edge spacing of about 1 inch. A thin crust pizza may have an edge spacing that is less than about 1 inch. The controller 44 may be programmed to automatically set the starting position of the nozzle 34 at the desired SOD based on the selection of the pizza type made by the operator. The sauce dispensing begins at the SOD and terminates at the sauce inner diameter SID. In the embodiment shown, the opening 106 of the nozzle 34 has a constant width to dispense the sauce in a ribbon pattern having a generally constant width. FIG. 12 shows the sauce on the pan 20 in a ribbon pattern with a constant width, which may be about 1–1.25 inches. More typically, the ribbon has some overlap in the edge region near the edge of the pan 20 as opposed to the center region to achieve uniformity in thickness, because the path speed of the nozzle 34 along the spiral path of the pan 20 is larger in the edge region than in the center region which reduces the sauce thickness in the edge region. In general, the overlap decreases from the edge region to the center region. The use of the overlap improves the thickness uniformity. The amount of sauce overlap decreases as the nozzle 34 approaches the center region of the pan 20. The SID is small, but is typically not zero. Because the surface area of the pan 20 decreases as the nozzle 34 is moved toward the center of the pan 20, terminating the sauce dispensing prior to reaching the center of the pan 20 avoids excessive sauce buildup in the center and improves the uniformity of the sauce thickness. For instance, the SID may be about 1 inch.

Figure 13:
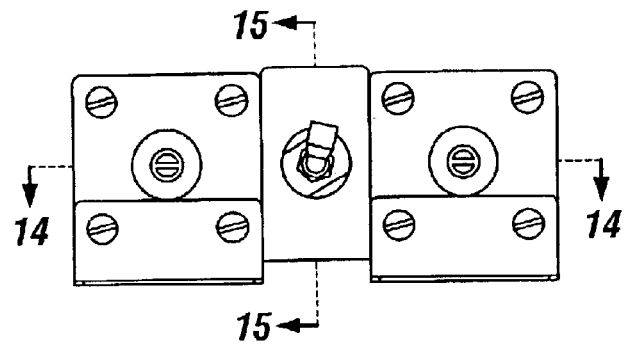
FIG. 13 is a bottom plan view of an accumulator assembly in the sauce pumping system of FIG. 1 according to an embodiment of the present invention.
Figures 14, 15:
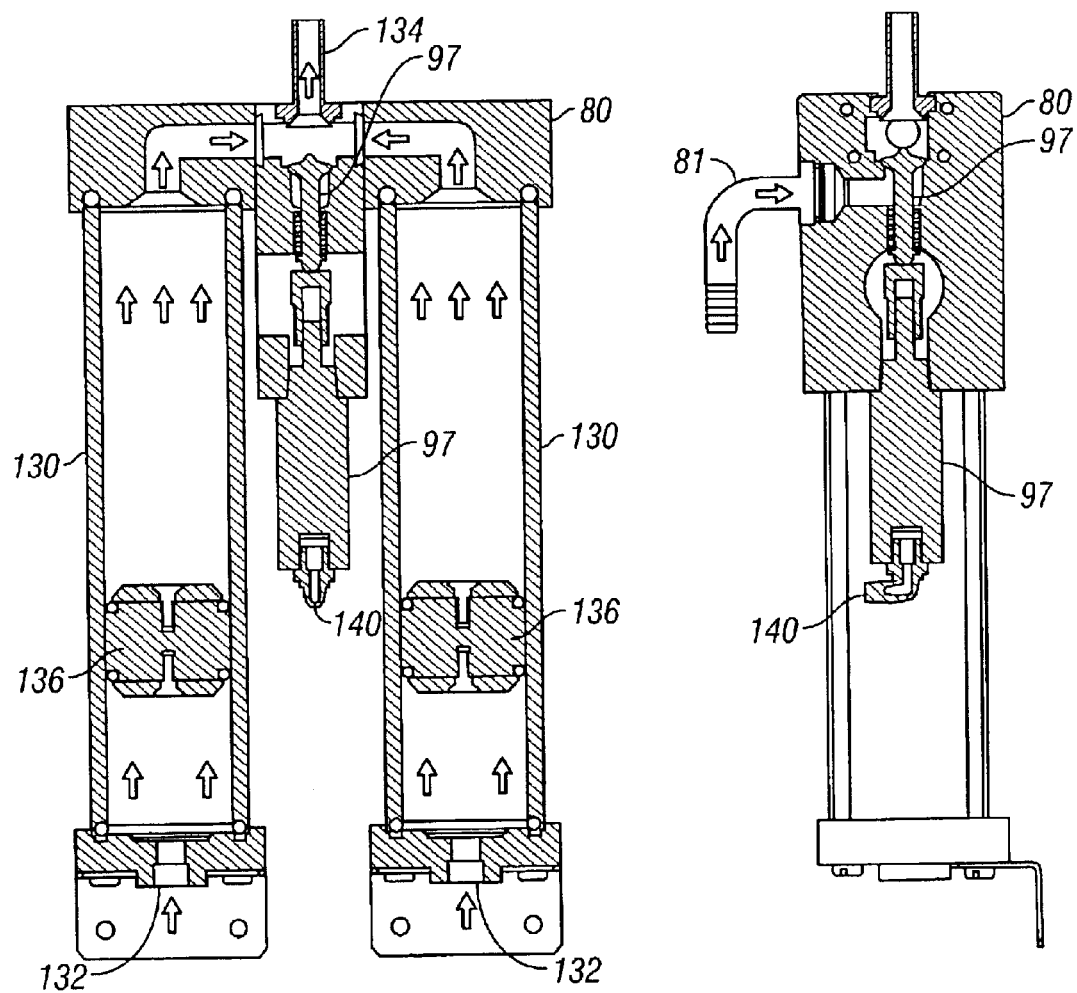
FIG. 14 is a cross-sectional view of the accumulator assembly of FIG. 13 along line XVI—XVI showing a diverter valve in a dispense position.
FIG. 15 is a cross-sectional view of the accumulator assembly of FIG. 13 along line XV—XV showing the diverter valve in the dispense position.

As illustrated in FIGS. 13–18, the accumulator assembly 80 includes two accumulator chambers 130. In other embodiments, one or more chambers may be used. Each accumulator chamber 130 includes a gas inlet 132, a common outlet 134, and a piston 136 disposed therebetween. The diverter valve 97 is actuatable to open and close the inlet 81, thereby allowing or blocking sauce flow into the chambers 130. The diverter valve 97 as shown is actuatable by air through an air cylinder 140 to move between an open position and a closed position. In the dispense mode, the diverter valve 97 is in the closed position to close the inlet 81 from the pump 76. In the recharge mode, the diverter valve 97 is in the open position to open the inlet 81 from the pump 76. During recharge as shown in FIGS. 16–18, the diverter valve 97 moves away from the inlet 81 and the sauce enters the sauce inlet 81 from the pump 76 into the accumulator chambers 130. The diverter valve 97 provides an optional feature in the recharge mode of closing the outlet 134 to shut off of the sauce flow out of the accumulator assembly 80 to minimize or eliminate dripping due to back pressure buildup in the line between the accumulator assembly 80 and the sauce dispenser 34. This back pressure may be caused by the presence of air bubbles in the sauce that may expand from the pumping and dispensing action. If the shut-off valve 82 is provided, the diverter valve 97 need not close the outlet 134 during the recharge mode. In the dispense mode as shown in FIGS. 13–15, the diverter valve 97 moves to the closed position and blocks the sauce inlet 81. Pressurized air enters the air inlets 132 into the chambers 130 and pushes the pistons 136 to drive the sauce from the chamber 130 through the outlets 134, via the open shut-off valve 82, to the dispenser 34 provided on the dispensing arm 30.

The pumping operation of the sauce pumping system 60 in FIG. 3 will now be described. Prior to dispensing the sauce, the pump 76 pumps the sauce from the vat 62 to the accumulator chambers 130 of the accumulator assembly 80. The air source 84 supplies air through the safety valve 86 and the filter regulator 88 to the four-way valve 90. The controller 44 sets the valve 90 to the recharge mode at position B. The air flows through the T-connector 96 to the air cylinder 140 of the diverter valve 97 to close the outlet 134 of the accumulator assembly 80. The air also flows to the pump 76 to pump the sauce to the accumulator inlet 81 to fill the accumulator chambers 130.

After the recharge of the sauce in the accumulator assembly 60 is completed, the controller 44 switches the four-way valve 90 to the dispense mode at position A. The pump 76 is deactivated and the diverter valve 97 returns to the open position to permit sauce flow from the accumulator chambers 130 through the accumulator outlet 134. Air flows through the pressure regulator 92 to the shut-off valve 82 to switch it from the closed position to the open position to permit sauce flow to the dispenser 34 on the dispensing arm 30. The air also flows through the air flow reduction circuit 94 which controls the air flow to the gas inlets 132 of the accumulator assembly 80 through the T-connector 95. The reduction circuit 94 includes a first path through a normally open flow line 160 and a second path through a flow reducer such as an orifice 162. When the sauce dispenser 34 is disposed above the outer portion of the pan 20 between the center portion and the outer edge, the controller 44 directs the air flow through the normally open flow line 160 to drive the accumulator pistons 136 to deliver the sauce from the accumulator chambers 130 to the dispenser 34 at a normal rate. When the sauce dispenser 34 is disposed above the center region of the pan 20, the controller 44 directs the air flow through the flow reducer 162 instead to drive the accumulator pistons 136 to deliver the sauce from the accumulator chambers 130 to the dispenser 34 at a reduced rate. Because the turntable 18 rotates at a constant speed, the sauce delivery rate needs to be reduced in the center region of the pan to produce a substantially uniform layer of sauce. The reduction in sauce delivery is achieved by reducing the air flow rate to the accumulator 80. The reduction may be continuous if a sophisticated controller is used to continuously adjust the air flow rate. Experiments have shown that discrete reduction is generally satisfactory. In particular, two discrete rates as provided by the normally open flow line 160 and the flow reducer 162 are used in the specific embodiment shown. The controller 44 switches the air flow to the flow reducer 162 when the dispensing arm 30 moves the dispenser 34 above the center region of the pan 20. For instance, for a total dispensing time of about 5–6 seconds at a rotational speed of about 90 rpm to cover a pan size having a diameter of about 12 inches, the air flow is switched to the flow reducer 162 at a transition time during approximately the last 1.5 seconds to deposit the sauce at a slower rate on the center region of the pan 20 having a transition diameter of about 4 inches. Of course, other ways of adjusting the gas or air flow rate to control the sauce flow may be used in different embodiments.

The sauce pumping system 60 advantageously provides a steady flow of sauce to the sauce dispensing apparatus 10. The sauce may be thick or thin in varying degrees, and the viscosity and consistency of the source may change from bag to bag. The use of the accumulator assembly 80 to drive the sauce to the dispenser 34 provides a robust way of handling sauces of varying viscosity, consistency, and particulate sizes and amounts.

Based on the input to the control panel 46 by the operator, the controller 44 controls operation of the rotary sauce dispensing apparatus 10 and the sauce pumping system 60 to dispense the sauce, as illustrated in FIG. 3. The operator places a dough loaded round pizza pan 20 on the surface of the turntable 18 amid the centering grip members 26 protruding through the surface of the turntable 18. The operator presses one or more buttons on the control panel 46 to select the type of sauce and pizza and to activate the centering hub 120 to move the grip members 26 simultaneously inward to center the pizza pan 20 on the turntable 18 (see FIGS. 10A and 10B). When the grip members 26 stop moving inward upon encountering the edge of the pizza pan 20, the pan size actuators 52 coupled with the grip members 26 activate the pan size sensor 28 on the base 14 at the radial location where the grip members 26 stop (see FIGS. 3, 4, and 7). The turntable 18 carrying the pan size actuators 52 is rotated by the drive motor 22 which moves at a constant speed, and the pan size sensor 28 sends signals to the controller 44 to indicate the size of the pizza pan 20. The rotational speed of the turntable 18 and pan 20 is measured by the rotational sensor 58 which is activated by the rotational actuator(s) 56.

The controller 44 activates the sauce pumping system 60 to pump the sauce and opens the shut-off valve 82 to allow the sauce to flow to the dispenser nozzle 34 of the dispensing arm 30. The recharging of the sauce in the accumulator chambers 130 and the dispensing of the sauce from the accumulator chambers 130 through the dispenser 34 to the pan 20 are described above. The movement of the dispensing arm 30 is controlled based on the size and rotational speed of the pizza pan 20, as well as the width of the nozzle opening 106 and the time set for dispensing the sauce along the spiral path to cover the dough on the pan 20. The dispensing arm 30 is driven by the linear motor 40 to move from the edge to the center of the pizza pan 20 along the linear track 38. The speed of the linear motor 40 is controlled and synchronized with the rotation of the pizza pan 20 to provide a uniform layer of sauce on the pizza dough. The sauce dispensing arm assembly is designed to provide the desired consistent thickness of the sauce on the entire pizza surface. Different ways of estimating the speed of the linear motor 40 may be used. The following formula is one example of calculating the speed of the linear motor 40 based on the rotational speed of the pizza pan, the pan size, and the width of the dispenser outlet 106:

The following describes one embodiment of controlling the linear motor 40 to move the dispensing arm 30. This is merely illustrative, and other schemes may be used. The given parameters include the time to dispense the sauce (Dispense Time), the sauce outer diameter (OD), the sauce inner diameter (ID), and the characteristics of the linear motor 40. Those characteristics include the Screw Pitch (inches/revolution) and the Motor Driver (steps/revolution). The linear motor 40 runs at a frequency that is updated every 10 ms, which is the Hz Step Time. Thus, 1/(Hz Step Time)=1/10 ms=100 per second.

The control steps are summarized as follows:
1. Calculate the #Hz Steps=Dispense Time/Hz Step Time=Dispense Time* 100.
2. Calculate the steps/inch (SI) of the linear motor 40 as SI=Motor Driver/Screw Pitch.
3. Calculate the Pour Steps=(ID−OD)*SI.
4. Calculate the frequency of the linear motor if a constant frequency is used to dispense the sauce by moving the linear motor at a constant velocity, where Constant Hz=Pour Steps*10/Dispense Time.
5. Calculate the start frequency (Start Hz), which is a preset percentage (Start Hz %) of the Constant Hz, where Start Hz=Constant Hz*(Start Hz %/100%).
6. Calculate the total frequency change (Total Hz Change) during the current 10 ms time period, where Total Hz Change=(Constant Hz−Start Hz)*2.
7. Calculate the frequency step (Hz Step) during the current 10 ms time period, where Hz Step=(Total Hz Change/Hz Step Time)/#Hz Steps=(Total Hz Change*100)/#Hz Steps.

The dispensing arm 30 is moved at a constant or linear accelerating motion during every 10 ms period of the pour. Every 10 ms, the frequency is updated by Hz Step, and the counter #Hz Steps is decremented. When the counter equals zero, the acceleration or deceleration is complete.

Figure 19:
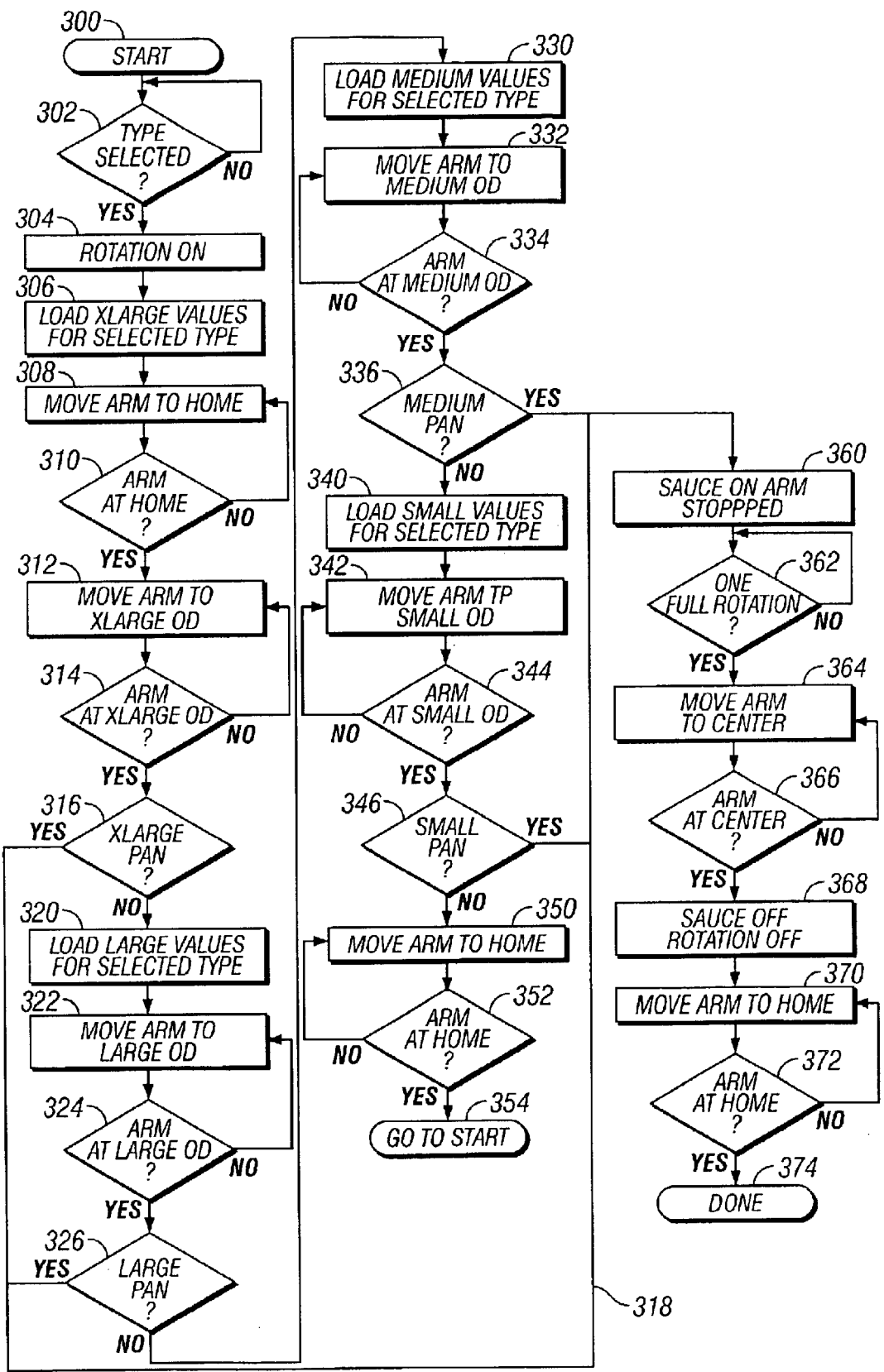
FIG. 19 shows a flow diagram of a method of operating the sauce pumping system and rotary sauce dispensing apparatus of FIG. 1 according to an embodiment of the invention.

FIGS. 19A–C show an example of how the controller 44 controls the operation of the sauce dispensing system comprising the dispensing apparatus 10 and the pumping system 60. At the start 300, the type of sauce dispensing is selected by the operator in step 302. The selection may include the type of sauce, type of pizza, and the like. Upon selection of the type, the controller 44 activates the rotation of the turntable 18 in step 304.

For the selected type, the controller 44 in step 306 loads the operating values for an extra-large pizza for the selected type. The operating values may include the pan outer diameter POD, sauce outer diameter SOD, sauce inner diameter SID, dispensing time, transition time or transition diameter, and the like. The dispensing arm 30 is moved to a home position in step 308. The home position is outside the SOD of the largest pizza for the apparatus. After checking to make sure the dispensing arm 30 is at the home position (step 310), the arm 30 is then moved to the extra-large outer diameter (XLarge OD) in step 312. After the dispensing arm 30 has been moved to the XLarge OD (step 314), the controller 44 determines whether the pan size sensor has sensed an XLarge pan (step 316). If so, the sauce dispensing can begin by following the process flow path 318.

If an XLarge pan is not sensed, the controller 44 loads the operating values for a large pizza for the selected type in step 320, and moves the dispensing arm 30 to the large outer diameter (Large OD) in step 322. After the dispensing arm 30 has been moved to the Large OD (step 324), the controller 44 determines whether the pan size sensor has sensed a Large pan (step 326). If so, the sauce dispensing can begin by following the process flow path 318.

If a Large pan is not sensed, the controller 44 loads the operating values for a medium pizza for the selected type in step 330, and moves the dispensing arm 30 to the medium outer diameter (Medium OD) in step 332. After the dispensing arm 30 has been moved to the Medium OD (step 334), the controller 44 determines whether the pan size sensor has sensed a Medium pan (step 326). If so, the sauce dispensing can begin by following the process flow path 318.

If a Medium pan is not sensed, the controller 44 loads the operating values for a small pizza for the selected type in step 340, and moves the dispensing arm 30 to the small outer diameter (Small OD) in step 342. After the dispensing arm 30 has been moved to the Small OD (step 344), the controller 44 determines whether the pan size sensor has sensed a Small pan (step 346). If so, the sauce dispensing can begin by following the process flow path 318. If not, the dispensing arm 30 is moved back to the home position in step 350. After the arm 30 reaches the home position (step 352), the process returns to start (step 354).

At the start of the sauce dispensing process flow path 318, the sauce dispensing nozzle 34 is turned on and the dispensing arm 30 is stopped at the SOD in step 360. The turntable 18 is allowed to make one full rotation in step 362 to ensure sufficient sauce is dispensed at the SOD. This is desirable because the dispense path is the longest at the SOD and the speed of the nozzle 34 along the dispensing path around the outer circumferential is the highest, so that the sauce thickness will be thin without overlap. After the nozzle 34 stays at the SOD for one full rotation, the controller 44 activates the linear motor 40 to drive the dispensing arm from the SOD to the SID in step 364. The speed of the linear motor 40 is controlled to ensure a substantially uniform sauce thickness according to the schemes described herein. After the dispensing arm 30 has reached the SID (step 366), the sauce is turned off and the rotation of the turntable is turned off in step 368. The dispensing arm 30 is returned to the home position (step 370). After the dispensing arm 30 reaches the home position (step 372), the process is done (step 374). The pumping system 60 can recharge the accumulator 80 for the next dispensing operation.

Based on the size and rotational speed of the pan 20, the controller 44 calculates the time it takes to maintain the sauce flow from the accumulator assembly 60 to the dispenser 34 to sauce the pizza. After sauce dispensing is completed, the shut-off valve 82 is closed and the diverter valve 97 is closed. The sauce pumping system 60 switches from the dispense mode to the recharge mode. The turntable motor drive 22 and the linear motor 40 are stopped to allow the removal of the pan 20 from the turntable 18.

The above-described arrangements of apparatus and methods are merely illustrative of applications of the principles of this invention and many other embodiments and modifications may be made without departing from the spirit and scope of the invention as defined in the claims. For instance, the dispenser arm may include multiple dispenser heads or nozzles mounted thereon to dispense different sauces. The operator can select the type of sauce and the controller activates the corresponding dispenser nozzle to dispense the sauce. The scope of the invention should, therefore, be determined not with reference to the above description, but instead should be determined with reference to the appended claims along with their full scope of equivalents.

What is claimed is:

1. A system for producing a flow of a sauce to a dispenser, the apparatus comprising:
    a rotating table configured to support and rotate the receiving surface thereon around an axis generally perpendicular to the receiving surface for receiving the sauce;
    a sauce dispensing member having a dispensing outlet disposed above the rotating table to dispense the sauce on the receiving surface disposed on the rotating table, the sauce dispensing member being movable between an edge position above an outer edge of the receiving surface and a center position above a center of the receiving surface;
    a sauce pumping device configured to deliver a flow of the sauce to the sauce dispensing member; and
    a controller coupled with the sauce pumping device and configured to control a sauce flow rate of the flow of the sauce to the sauce dispensing member based on a rotational speed of the rotating table and a speed of movement of the sauce dispensing member between the edge position and the center position.

2. The system of claim 1 wherein the controller is configured to control the sauce flow rate to form a layer of sauce on the receiving surface which is substantially uniform in thickness.

3. The system of claim 1 wherein the controller is coupled with the sauce dispensing member and configured to control a speed of movement of the sauce dispensing member between the edge position and the center position.

4. The system of claim 3 wherein the sauce dispensing member is movable substantially linearly between the edge position and the center position.

5. The system of claim 4 wherein the speed of movement of the sauce dispensing member between the edge position and the center position is controlled to provide more overlap in the sauce dispensed on the receiving surface near the edge position than near the center position.

6. The system of claim 1 wherein the sauce pumping device comprises:
    an accumulator including an accumulator chamber with an accumulator inlet to receive and store the sauce and a dispense member configured to dispense the sauce from the accumulator chamber out through an accumulator outlet;
    a pump configured to pump the sauce through the accumulator inlet to the accumulator chamber;
    a diverter valve coupled with the accumulator and being movable between a closed position to close the accumulator outlet and an open position to open the accumulator outlet;
    a control member coupled with the pump, the diverter valve, and the accumulator, the control member being configured to move the diverter valve to the closed position and activate the pump to pump the sauce through the accumulator inlet to the accumulator chamber in a recharge mode, and to move the diverter valve to the open position and drive the dispense member to dispense the sauce from the accumulator chamber out through an accumulator outlet in a dispense mode.

7. The system of claim 6 wherein the accumulator, the pump, and the diverter valve are activated by a gas.

8. The system of claim 7 wherein the control member comprises a control valve coupled to a gas source and being switchable between a recharge position in the recharge mode and a dispense position in the dispense mode, the control valve at the recharge position directing the gas to activate the pump to pump the sauce to the accumulator chamber and directing the gas to the diverter valve to move the diverter valve to the closed position, the control valve at the dispense position directing the gas to a gas inlet disposed on an opposite side of the dispense member from the sauce in the accumulator chamber to drive the dispense member to dispense the sauce from the accumulator out through the accumulator outlet, the pump being deactivated and the diverter valve returning to the open position with the control valve in the dispense position.

9. The system of claim 8 wherein the sauce pumping device further comprises a gas flow controller to control the gas flow to the accumulator inlet to adjust a flow rate of the sauce dispensed from the accumulator by the dispense member.

10. The system of claim 9 wherein the gas flow controller is switchable between discrete flow paths having different flow rates.

11. The system of claim 10 wherein the discrete flow paths comprise a nonrestricted flow path and a flow reduction path which has a flow reduction orifice.

12. The system of claim 11 wherein the controller is configured to switch the gas flow controller from the nonrestricted flow path to the flow reduction path after the sauce dispensing member has moved from the edge position to an intermediate position between the edge position and the center position.

* * * * *